United States Patent [19]
Dietz et al.

[11] Patent Number: 5,663,109
[45] Date of Patent: *Sep. 2, 1997

[54] LOW TEMPERATURE GLASS PASTE WITH HIGH METAL TO GLASS RATIO

[75] Inventors: Raymond L. Dietz, Georgetown; David M. Peck, Salem, both of Mass.

[73] Assignee: Quantum Materials, Inc., San Diego, Calif.

[*] Notice: The term of this patent shall not extend beyond the expiration date of Pat. No. 5,543,366.

[21] Appl. No.: 654,852

[22] Filed: May 29, 1996

Related U.S. Application Data

[63] Continuation-in-part of Ser. No. 265,919, Jun. 27, 1994, Pat. No. 5,543,366, which is a continuation-in-part of Ser. No. 962,924, Oct. 19, 1992, Pat. No. 5,334,558.

[51] Int. Cl.$^6$ .................................................. C03C 3/12
[52] U.S. Cl. ........................... 501/41; 501/17; 501/19; 501/20; 106/1.14
[58] Field of Search ............................. 501/41, 17, 19, 501/20; 106/1.14

[56] References Cited

U.S. PATENT DOCUMENTS

| | | | |
|---|---|---|---|
| 3,798,114 | 3/1974 | Chvatal | 161/191 |
| 3,853,568 | 12/1974 | Chvatal | 106/47 |
| 4,401,767 | 8/1983 | Dietz et al. | 501/19 |
| 4,636,254 | 1/1987 | Husson, Jr. et al. | 106/1.14 |
| 4,743,302 | 5/1988 | Dumesnil et al. | 106/1.23 |
| 4,761,224 | 8/1988 | Husson, Jr. et al. | 106/1.14 |
| 4,933,030 | 6/1990 | Dietz | 106/1.14 |
| 4,945,071 | 7/1990 | Friesen et al. | 501/41 |
| 4,996,171 | 2/1991 | Davey et al. | 501/19 |
| 4,997,718 | 3/1991 | Dumesnil et al. | 428/426 |
| 5,013,360 | 5/1991 | Finkelstein et al. | 106/1.23 |
| 5,013,697 | 5/1991 | Akhtar | 501/46 |
| 5,334,558 | 8/1994 | Dietz et al. | 501/41 |
| 5,543,366 | 8/1996 | Dietz et al. | 501/41 |

FOREIGN PATENT DOCUMENTS 9015072.3  7/1991  European Pat. Off.

OTHER PUBLICATIONS

Ohlberg et al., *Determination of Percent Crystallinity of Partly Devitrified Glass by X–Ray Diffraction*, American Ceramic Society, Oct. 1960, pp. 170–171.

Dimitriev et al., *Glass Formation and Properties in the $Ag_2O-TeO_2-V_2O_5$ System*, Mar. 1972, vol. 25, No. 9, pp. 1205–1208.

Imaoka et al., *Glass–Formation Ranges of Ternary Systems (Part 4) Tellurites of a–Group Elements*, Institute of Industrial Science, University of Tokyo, Jan. 1975, vol. 24, No. 2, pp. 1–55.

Imaoka et al., *Glass–Formation Rnages of Ternary Systems (Part 5) Tellurites Containing b–Group Elements*, Institute of Industrial Science, University of Tokyo, Jul. 1976, vol. 26, No. 1, pp. 1–46.

Sveshtarova et al., *Phase Equilibrium in the $PbO-TeO_2-V_2O_5$ System*, Jun. 1981, vol. 34, No. 12, pp. 1671–1674.

Ivanova et al., *Phase Equilibria of the $Ag_2O-TeO_2-V_2O_5$ System*, Higher Institute of Chemical Technology, Bulgaria, 1981, Materials Chemistry 6, pp. 287–298. (no month).

Ivanova et al., *Phase Equilibrium of the $Ag_2O-TeO_2-V_2O_5$ System in the $Ag_2O$ Rich Regions*, Higher Institute of Chemical Technology, Bulgaria, 1985, Materials Chemistry and Physics, pp. 397–402. (no month).

*Primary Examiner*—Deborah Jones
*Attorney, Agent, or Firm*—Baker, Maxham, Jester & Meador

[57] ABSTRACT

A metal/glass paste composition with a high metal to glass ratio and a method of using the paste to adhesively connect an integrated circuit to a ceramic substrate. The glass composition consists essentially of, by weight percent on an oxide basis:

about 40–65% $Ag_2O$
about 15–35% $V_2O_5$
about 0–30% $PbO_2$
about 0–20% $TeO_2$ The essentially resin-free paste utilizes the glass composition described above and, for a metallized ceramic substrate, has a metal:glass ratio of from about 8:1 up to about 11.5:1. For a bare (nonmetallized) ceramic substrate, the paste has a metal:glass ratio of from about 8:1 up to about 32:1.

18 Claims, 3 Drawing Sheets

LOW TEMPERATURE GLASS PASTE WITH HIGH METAL TO GLASS RATIO

This application is a continuation-in-part of application Ser. No. 08/265,919, filed Jun. 27, 1994, now U.S. Pat. No. 5,543,366, which is a continuation-in-part of Ser. No. 07/962,924, filed Oct. 19, 1992, now U.S. Pat. No. 5,334,553 issued to Dietz et al. on Aug. 2, 1994, the disclosures of which are expressly incorporated by reference herein.

TECHNICAL FIELD

This invention relates to low temperature glasses, namely low temperature crystallizing glasses with low temperature crystal remelts that allow low temperature bonding of the glass to ceramic substrates commonly used in the electronics industry and methods of forming the same. The final crystallized form of the glass after processing has significant advantages for bonding semiconductor devices to ceramic substrates utilizing silver glass pastes and in the application of low temperature sealing glasses.

BACKGROUND OF THE INVENTION

As related in U.S. Pat. No. 4,933,030 by the same applicant as the present application, a low temperature glass was developed which overcame many of the limitations of the then-existing glass compositions used in Ag/glass die-attached industry. The teachings of the '030 patent are incorporated herein by reference. "Ag/glass" refers to loading a glass with an Ag powder and a suitable organic to make a "paste" which, when applied under an integrated circuit device and correctly processed, will create the required electrical, mechanical, and thermal properties of the resultant assembly. To summarize, the technical advances accomplished by the invention described in U.S. Pat. No. 4,933,030 are:

1. Reduction of the high processing temperatures required to generate adequate adhesion of a die to an integrated circuit package. The performance and yield of high density integrated circuit devices are impaired by high (generally >400° C.) processing temperatures. The capability of attaching these temperature-sensitive devices at lower temperatures (e.g. less than 350° C.) was shown to be very beneficial to the user.

2. Increased reliability and decreased processing of the ceramic packages that house the temperature-sensitive integrated circuit devices. Performing the die-attach process at a temperature less than 350° C. eliminates or greatly reduces the oxidation of the nickel plating under the Au plating as compared to processing at 400° to 450° C., the required temperature for prior art lead-borate based Ag/glass system. When processed at 400° to 450° C., an additional forming gas process step is generally required to reduce the nickel oxide and achieve adequate wetting of the AuSn pre-forms used to hermetically seal the device in its ceramic package. This improved hermetic yield and the elimination of a costly process step was made possible by the introduction of the product described in U.S. Pat. No. 4,933,030.

3. Elimination of a resin material as part of the organics in a Ag/glass. Prior to the product described in U.S. Pat. No. 4,933,030, Ag/glass compositions had always employed a resin to give the paste the proper rheology for applying the Ag/glass material with an automated dispenser, as well as enhancing the suspension power and stability of the paste. These resins, typically acrylic in nature, have two major disadvantages when present in any significant mount in an Ag/glass: (1) they were known to retain moisture which contributes to the "residual" moisture sealed in the package and has been shown to significantly and adversely impact the reliability of the final hermetically sealed device; and (2) the resins all have relatively high temperature burn-out properties, typically greater than 300° C. The evolution of the burn-out gases requires a controlled ramp in temperature during the die-attach process to prevent lifting the die, separating it from the Ag/glass adhesive, and causing catastrophic adhesion failures. Thus, the invention described in U.S. Pat. No. 4,933,030 eliminated the resin, thereby reducing the moisture levels, as well as making possible much faster processing during the die-attach cycle.

The invention described in U.S. Pat. No. 4,933,030 did, in fact, overcome many obstacles of the then-existing art, namely, increasing the device and package reliability and significantly reducing the assembly costs by eliminating the separate drying and forming gas clean-up cycle. However, it did leave room for improvement. Although an important advance in other respects, the $Tl_2O_3/V_2O_5/P_2O_5$ glass described in U.S. Pat. No. 4,933,030 did not have the thermal cycling resistance of the established Pb-Borate glass system. Finished devices that utilize these glasses ire often subjected to long-term thermal cycling. When parts were cycled from −65° to 150° C.,(Mil Std 883, Condition C) for 1000 cycles, the adhesion would substantially decrease in value as a result of the thermal cycling stress. Although the resultant adhesion values would pass Mil Std 883 requirements, they were significantly lower than the values generated by the higher temperature Ag/glass systems.

Various attempts have been made in the prior art to develop glass compositions that are capable of processing at low temperature (glass transition temperature, Tg, less than 250° C.) and that have high thermal stress resistance, especially when incorporated into Ag/glass compositions. Unfortunately, generally speaking, as the Tg of a glass is reduced, the thermal expansion is increased making it very difficult to achieve a low temperature Ag/glass with high thermal stress resistance because of the large mismatch of expansion between the silicon semiconductor device (≈3 ppm/° C.) and the low temperature glass, which inherently has a very high expansion (15–25 ppm/° C.). The glass described in U.S. Pat. No. 4,933,030 offers low temperature processing capabilities (processing as low as 300°–325° C.), but does show adhesion degradation of greater than 50% when subjected to the 1000 cycles, condition C of Mil Std 883 (−65° C. to 150° C.).

On the other hand, the Pb-Borate Ag/glass described in U.S. Pat. No. 4,401,767 shows minimum degradation when subjected to the same thermal cycling test, but has a high Tg of ≈325° C. which necessitates processing the Ag/glass at temperatures greater than 400° C. Thus, it is apparent that there exists a large need in the art for a glass, paste, and method of use that overcomes the above-described problems and gives both a low processing temperature and improved properties, most especially the thermal stress resistance of the existing low temperature systems. The present invention describes a novel approach in the glass design and method of forming that will accomplish these goals.

The prior art (including U.S. Pat. No. 4,933,030) historically speaks of the need to utilize bonds having a glass structure that is substantially non-crystalline, since crystallization of a glass during the processing increases the viscosity and impedes the wetting of the glass to an underlying substrate. For this reason, all the present Ag/glass compositions in the marketplace utilize essentially vitreous glasses, e.g. JMI's Pb-Borate glass described in U.S. Pat. No. 4,401,767; their PbO-$V_2O_5$-Phosphate glass described in U.S. Pat. No. 4,996,171; QMI's Pb-Borate glass described in U.S. Pat. Nos. 4,761,224 and 4,636,254; VLSI's PbO-$V_2O_5$ glasses described in U.S. Pat. Nos. 4,743,302 and 5,013,360 and their $Ag_2O$-$P_2O_5$ glass described in U.S. Pat. No. 4,997,718; and National Starch & Chemical's $Ag_2O$-$V_2O_5$-$TeO_2$-PbO glasses described in U.S. Pat. No. 4,945,071. The parent patent and application disclose a novel discovery of a low temperature crystallizing glass with superior properties, such as thermal stress resistance, compared to an essentially vitreous glass of a similar Tg. The crystallizing glass disclosed therein exhibits a low Tg on early (or low temperative) crystallization (Tc) a low temperature remelt of these crystals (Tr) and a significant crystallization during the cool down of the glass as will be more fully explained later.

Friessen et al in U.S. Pat. No. 4,945,071 describes a $TeO_2$/$V_2O_5$/$Ag_2O$/PbO system which is essentially vitreous with a glass transition temperature of about 260° C. The crux of the Friessen invention was to keep any crystallization from occurring. Friessen glasses were designed to have no crystal peak temperature or a crystallization temperature that is beyond the processing temperature of the Ag/glasses he described. Particularly key to keeping the glass essentially vitreous (no crystal peak or a high temperature crystal peak) was the addition of PbO as described in Column 5.

Aside from an entirely different composition, the composition disclosed in the parent patent and application has several significant distinctions from the above described art. It is believed that the glass system disclosed therein promotes a very low temperature crystallization, rather than preventing crystallization along with a very low temperature remelt of these crystals. Furthermore, the crystals remelting create a much lower viscosity glass at a lower temperature than the Friessen glasses and, furthermore, allow processing of semiconductors at substantially lower temperatures (≈100° C. lower) while still creating the necessary adhesion along with the associated advantages heretofore described. Unlike the Friessen glasses, the glasses end up largely crystallized in the final processed form when cooled, which is considered essential for low temperature glasses to exhibit the desired properties (e.g. thermal cycle endurance) as will be described in detail later.

Dumesnil and Finkelstein in U.S. Pat. No. 4,997,718 describe a high $Ag_2O$ glass composition, including mostly $P_2O_5$ and $B_2O_3$, as the balance of the composition. These glasses are essentially vitreous, water soluble with high expansion, and fairly low Tg, about 250° C.

Chvatal, in U.S. Pat. Nos. 3,798,114 and 3,853,568, describes high $Ag_2O$ low temperature glasses that are essentially vitreous, some of which contain combinations of $Ag_2O$.$V_2O_3$ and $TeO_2$. Chvatal teaches the use of $AgNO_3$ as a required batch material for $Ag_2O$. The Chvatal patents do not teach the effectiveness of these glass compositions in a Ag/glass die-attach paste, nor do they teach a partially crystalline finished structure or the potential benefits thereof.

Akhtar in U.S. Pat. No. 5,013,697 and Dumesnil and Finkelstein in U.S. Pat. No. 4,743,302 describe sealing glasses, comprising the PbO/$V_2O_5$ binary with a combination of other oxides, and low expansion ceramic fillers to produce a series of low melting vitreous sealing glasses.

The parent patent and application disclose that glasses can be designed to crystallize at low temperature with an accompanying low temperature remelt of that crystal. The resulting glasses, when incorporated in Ag/glasses, will bond at a lower temperature like the $Tl_2O_3$/$V_2O_5$/$P_2O_5$ glasses defined in the U.S. Pat. No. 4,933,030, but with marked improvement in properties, especially in thermal stress resistance and chemical durability. These new glasses are characterized by low Tgs (about 250° C. or less), low-temperature crystal formation (about 300° C. or less), a low temperature remelt of these crystals (about 350° C. or less) and a crystalline fired structure with excellent stability after processing.

A result disclosed in the parent patent and application is the controlled crystallinity of the finished glass so as to provide a fired glass/ceramic when processed as an Ag/glass paste for die-attach. The controlled crystallization of the fired glassy structure greatly contributes to providing the high adhesions of the die-attach and the resistance to degradation when thermal-cycled, as will be described in detail later. It is believed that the in-situ crystallization provides crystal sites that prevent the propagation of fractures occurring at the silicon die/Ag-glass interface as will be discussed later in detail. There is a large mismatch in expansion between silicon (≈3 ppm/° C.) and low temperature glasses, generally 15–25 ppm/° C. As noted earlier, as the temperature properties of a glass are decreased, the expansion coefficient increases creating a need for a partially crystallized structure that provides resistance to thermal cycling degradation.

Heretofore, one of the major problems of low temperature die-attach materials has been the relatively poor thermal stress resistance, compared to the higher (>400° C.) temperature materials. This disclosure describes in detail how the glass system and method overcomes the deficiency in thermal stress resistance while retaining low temperature processing capabilities. The addition of low thermal expansion oxides, of about 1–25% by weight, to the glass composition for purposes of further improving the thermal stress-resistance, and for using the combination as a sealing glass or as an insulating material, is also disclosed.

SUMMARY OF THE INVENTION

It is apparent from the above that a need exists for an improved glass composition, paste and method of use for bonding an integrated circuit to a substrate. The glass composition has the following qualities:

1) a glass transition (Tg) temperature of about 250° C. or less, preferably 200° C. or less, or most preferably about 150° C.
2) a crystallization temperature (Tc) of about 300° C. or less, preferably less than 250° C., or most preferably about 200° C.
3) a crystal remelt temperature (Tr) of less than about 300° C., preferably less than 300° C., or most preferably about 275° C.

One glass system that possesses these essential glass properties consists essentially of by weight percent on an oxide basis:

about 40–65% $Ag_2O$
about 15–35% $V_2O_5$
about 0–30% $PbO_2$
about 0–20% $TeO_2$ A unique, completely or essentially resin-free organic system is used in connection with the novel glass composition described above. That organic system also comprises a solvent or a blend of solvents at times used in combination with a very slight amount of resin, such as Hercules EHEC ethyl cellulose, to optimize the theology of the paste for dispensing. Advantageously, this organic system allows rapid processing of large die without creating voids.

Such pastes, furthermore, find unique applicability when attaching electronic components to ceramic packages, either bare or metallized with a metal such as gold. For this reason, an improved method is disclosed herein for attaching an electronic component, such as an integrated circuit silicon die, to a ceramic (substrate) at a temperature below 350° C. Particularly, the method includes applying an Ag/glass paste of this invention as a bonding agent between the parts to be bonded into a package, and heating the package to a temperature for a time sufficient to fuse the glass, thereby to bond the device to the ceramic and thereafter cooling the package to room temperature.

In the preferred embodiments the paste includes silver flake, the resulting bond is a partially crystalline glass ceramic, and has a moisture content in a final sealed package significantly below 5000 ppm. In the parent application Ser. No. 08/265,919, it was disclosed that the pastes are effective with ratios of silver to glass (solids) of about 3:1 to about 7:1 and that such pastes were found to be reasonably effective with ratios of silver to glass (solids) up to about 8:1.

However, it has now been found that the metal:glass ratio can be much higher, up to at least 11:1 for metallized ceramic substrates and up to 32:1 for bare ceramic substrates, using the standard bonding process described herein. In addition to unexpectedly high adhesion of the resultant bond, the thermal conductivity and elasticity (as measured by Young's modulus) have been improved.

It has been found that low temperature glasses have good fluidity at low temperatures, and partially crystallize when allowed to cool to room temperature. It has also been found that a silver/glass die-attach material that incorporates the above glasses makes possible the inorganic attaching of semiconductor devices at both low and high temperatures (e.g. less than or greater than 350° C.) and exhibits improved thermal cycling resistance properties over the silver/glass die attach material described in U.S. Pat. No. 4,933,030.

It has also been found that a silver/glass paste without the use of any substantial mount of resins gives superior dispensing properties and faster processing without creating voids or retaining significant amounts of moisture.

It has also been found that an Ag-filled glass will significantly minimize residual stress (thermally induced) in the die, particularly when larger dies are packaged.

It has been found that the low temperature sealing glass composition described herein will hermetically seal package parts together. This includes low expansion refractory fillers as described herein.

BRIEF DESCRIPTION OF THE DRAWINGS

The present invention will now be described with respect to certain embodiments thereof, in association with the accompanying drawings, wherein.

DETAILED DESCRIPTION OF THE PREFERRED EMBODIMENT

The glass compositions described herein have a wide field of use. Of particular importance and, thus, as the preferred environment for use of these glass compositions, is the art of bonding an electronic device to a ceramic. A particularly preferred usage is where an integrated circuit silicon die is to be bonded to a ceramic substrate, and the glass compositions described herein form the glass material in a paste, which further includes a solvent or combination of solvents with an optionally small amount of resin, with an additive powder, particularly particles of silver (Ag). Such a paste is generally referred to as an Ag/glass die-attach paste.

Figure 1:
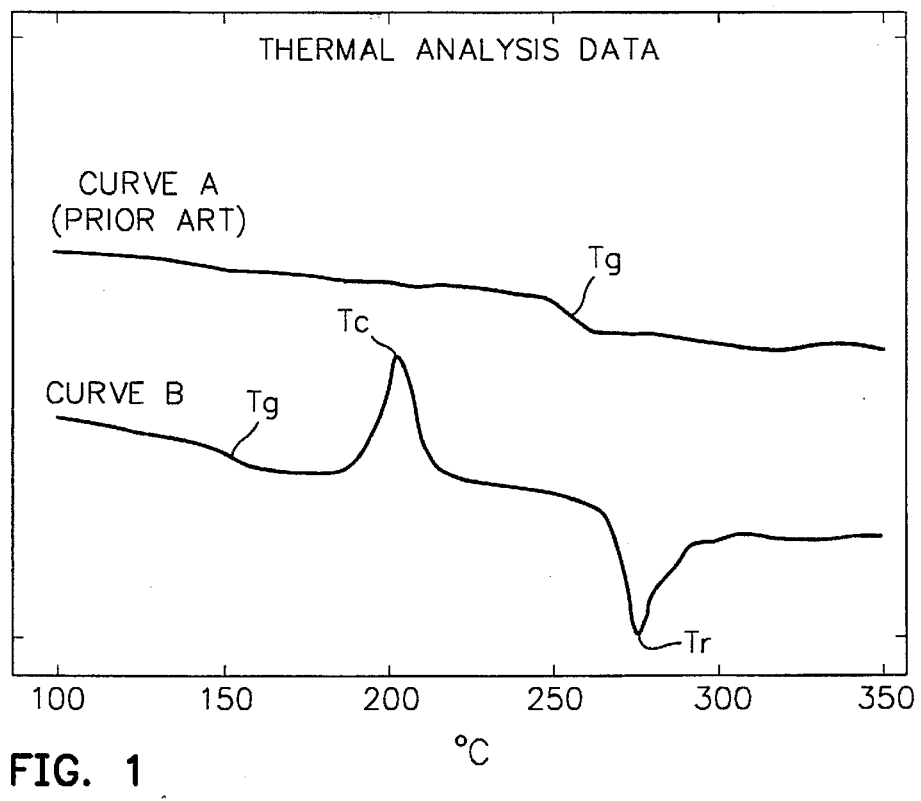
FIG. 1 is a thermal analysis plot showing the difference in glass properties of the prior art compared to the new invention.

Most of the characteristics of the Ag/glass structure can be illustrated graphically with reference to FIG. 1 which shows differences in glass properties between prior art compositions and the Ag/glass structure described herein. FIG. 1 is a thermal analysis plot by a Differential Scanning Calorimeter (DSC). By heating a small sample of the glass powder, the measured change in energy shown in the vertical axis is plotted against temperature on the axis. Other glasses are illustrated by curve A. The first small change in energy level is known as the glass transition temperature (Tg) where the glass changes from a solid to a more plastic structure free of stress. For example, the glasses described by Friessen in U.S. Pat. No. 4,945,071 and Dumesnil in U.S. Pat. No. 4,743,302 are examples of glasses whose DSC is depicted in Curve A. There also exists glass with a similar DSC but with high Tg ($\approx$300° C.) e.g. JMI's glass described in U.S. Pat. No. 4,701,767 and Diemat's glass described in U.S. Pat. No. 4,933,030 with a much lower Tg ($\approx$150° C.).

As glasses of the type illustrated by curve A (FIG. 1) are heated, the viscosity of the glass decreases in viscosity until low enough to wet the surfaces to be bonded and form an adhesive bond. Generally, the temperature required to reach this required low viscosity would be at least 100°–150° C. higher than the Tg. Upon cooling the viscosity increases gradually until reaching a maximum at the Tg. As indicated earlier, the lower the Tg, the higher the expansion of the glass in the final assembly. Thus, when the assembly is subsequently thermal cycled, the large expansion mismatch creates microcracks in the glassy structure and degrades the adhesion of the silicon die to the substrate as discussed earlier.

The DSC plot depicted in Curve B represents a glass of the new invention. This glass has a low Tg of $\approx$150° C. Upon further heating the glass crystallizes at about 200° C., (Tc) showing an exotherm on the DSC plot. The teachings of the prior art normally considered this crystallization (exotherm) an undesirable reaction since the viscosity of the glass increases sharply inhibiting any wetting of the glass to the interface at the die and substrate. However, further heating of the crystallized structure creates a remelt (Tr) of the initially formed crystals at a very low temperature of about 275° C. This endothermic reaction of remelting the crystals is useful because the glass now abruptly changes to a low viscosity state that allows the glass to wet the interfaces and create a strong bond. Further heating of the assembly has no detrimental impact and can be heated as high as 450° C. or higher without adverse effects.

As the die/Ag glass/substrate assembly is cooled, another reaction occurs, namely recrystallization of the amorphous glass at about 200° C. This can be detected, although not shown, as another exothermic peak on the DSC curve. The recrystallization during the cool down is useful for the thermal stress resistance, as will be described later. The degree of crystallizing and remelting can be measured by the energy under the curve, expressed in units of joules/gm. The glass composition described herein has the thermal reactions described in Curve B of FIG. 1, namely a low Tg, an early crystallization (Tc), a low temperature remelt (Tr) of these crystals, and a recrystallization during the cool down.

The glass compositions are based on an $Ag_2O$ and $V_2O_5$ ratio near the eutectic composition which yields low temperature properties. However, excessive and uncontrolled crystallization occurs with this binary eutectic composition. The crystallinity can be controlled by specific combinations of glass formers along with process parameters. $TeO_2$ and $PbO_2$ or $Pb_3O_4$ appear to serve as the primary stabilizing agents and, hence, if too much is used, little crystallinity is possible, as in the prior art Friessen glasses; or, if an insufficient mount is used, excessive crystallization will occur with a relatively high remelt temperature, causing poor adhesion due to the lack of sufficient glassy phase present to wet the interfaces for good adhesion at lower temperatures. Thus, an optimum amount and combination of $TeO_2$ and $PbO_2$ provide a glass possessing the low temperature properties along with the desired crystallinity of the finished structure. The glass compositions consist essentially of, by weight on an oxide basis:

about 40–65% $Ag_2O$ about 15–35% $V_2O_5$ about 0–20% $TeO_2$ about 0–30% $PbO_2$ Preferably, they consist essentially of, by weight on an oxide basis:

about 40–50% $Ag_2O$ about 15–25% $V_2O_5$ about 5–15% $TeO_2$ about 10–25% $PbO_2$ These glasses all form stable vitreous glasses during the melting process, but upon retiring, have different amounts of crystallinity present in the final structure. The amount of crystallinity enabled by the selection and percentage of components present in the glass composition is controlled, such that it falls within a preferred range which is substantially less than 100%. The amount of crystallinity present in the final glass structure is dependent primarily upon the specific ratios of the components of the glass composition and the melting process parameters used. The amount of crystallinity, as stated earlier, is the key to the adhesion as illustrated in Table I of the parent U.S. Pat. No. 5,334,558, which is incorporated by reference herein.

A particularly preferred glass composition for use in a Ag/glass die-attach paste that exhibits superior adhesion at low temperatures and superior thermal cycling resistance, consists essentially of:

about 47% $Ag_2O$ about 22% $V_2O_5$ about 9% $TeO_2$ about 22% $PbO_2$ hereafter referred to as example M666.

The M666 preferred composition, when used in a Ag/glass paste and processed in accordance with the present invention, had not only unexpectedly high adhesions, but possessed other significant advantages. Most importantly, the thermal-cycled adhesion values did not degrade significantly as compared to the preferred glass, example M44 of U.S. Pat. No. 4,933,030, as shown in Table 2 of the parent applications, which are incorporated by reference herein.

The expansion of the M44 glass is about 23 PPM/° C., whereas the expansion of the M666 glass is about 19 ppm/° C. The lower expansion glass is preferable because it is a closer expansion match to the silicon die which is about 3 ppm/° C. However, the mismatch in expansion is still very wide and therefore the somewhat lower expansion alone doesn't explain the higher initial adhesions accompanied by a high retained adhesion after thermal cycling.

This vast improvement in properties is believed to be attributable to the controlled mount of crystallinity present in the fired glass. It is postulated that the crystal sites not only strengthen the glassy structure, but also prevent propagation of microcracks caused by the mismatch in expansion of the glass and the silicon die. In contrast, upon temperature cycling with vitreous glasses, these initial microcracks continue to propagate and weaken the entire assembly. The partially crystallized glass, on the other hand, possesses crystal sites which serve to prevent the microcracks from growing. The crystal sites are believed to be a complicated $Ag_2O$-$V_2O_5$-$TeO_2$-$PbO_2$ crystal with specific stoichiometric ratios. This phenomenon is thought to be largely responsible for the high retention of adhesion after temperature cycling.

The formulation of the glasses of the present invention is accomplished in a fashion, similar to that described in detail in U.S. Pat. No. 4,933,030 and those procedures are incorporated herein by reference. Although $Ag_2O$, $V_2O_5$, $PbO_2$ and $TeO_2$ are the four preferred ingredients of glass, it is recognized that combinations other than these may accomplish similar glass properties, namely appropriate Tg, Tc & Tr temperatures and are considered part of the present invention. It is recognized that many other ingredients may be added to the basic formulation in various amounts, and these are also considered to be within the scope of the present invention. Generally speaking, additions in amounts of other materials greater than about 10% tend to adversely alter the properties of the glass, although this is not always true, e.g. $Tl_2O_3$.

The examples shown in Table 3 of the parent applications (which are incorporated by reference herein) illustrate how the preferred ranges were determined, as well as the various additives that were employed, such as $P_2O_5$, $Tl_2O_3$, $Bi_2O_3$, CuO or $Cu_2O$, $B_2O_3$, $MnO_2$, PbO, $Pb_3O_4$, $SnO_2$, $Ta_2O_5$, $Nb_2O_5$, $Y_2O_3$, $SiO_2$, $Al_2O_2$, and $WO_3$.

From this group of examples shown in Table 3, a particularly preferred glass composition was chosen, namely, example M666. Note that many melts have more than one crystallization and/or remelt temperature. The M666 melt displays a single low temperature remelt which is ideal because the glass reaches a low viscosity state for bonding at a lower temperature. The details of this composition and the processes of forming a Ag/glass die-attach paste which when after processing as a die attach paste contain a significant amount of crystallinity are described below. A glass composition, M666, was weighed in a large batch as follows:

| weight % on an oxide basis | | wt (gm) |
| --- | --- | --- |
| $Ag_2O$ | 46.9 | 140.7 |
| $V_2O_5$ | 22.0 | 66.0 |
| $TeO_2$ | 8.9 | 26.7 |
| $PbO_2$ | 22.2 | 66.6 |
| | 100.0 | 300.0 gm |

The oxides were weighed and thoroughly blended together in a plastic container. Purity of the oxides was 99.9% minimum with very low alkali content. The mobility of alkali ions is known to cause corrosion in semiconductor packaging.

The blend was then transferred to a porcelain crucible and placed in a melting furnace. After reaching approximately 550° C., the melt was removed and stirred to assure complete melting and homogeneity and then placed back in the furnace and heated to a peak temperature of 580°–600° C. After holding the temperature above 580° C., but not greater than 620° C., the melt was poured through cold stainless steel rollers creating thin sheets of a vitreous glass which is ideal for subsequent grinding. Peak temperatures of less than about 580° C. or greater than about 620° C. were shown to create multiple and higher temperature remelts.

The resulting glass flakes were then crushed and loaded into a high alumina jar mill with high density grinding media, such as $Al_2O_3$ or zirconia, along with isopropyl alcohol and wet ground to a fine powder. After drying, the free glass powder was sieved. The resulting average particle size was measured by surface area, which fell within 0.1 to 0.5 $m^2$/gm. Powders with surface area much greater than 0.5 $m^2$/gm had a tendency to create excessive crystallization during the refire.

Other methods of glass flake/powder manufacture are available including: water quenching, attritor milling, jet milling, hammer milling and beater milling. These methods are obvious to those skilled in the art.

The resulting fine powder was analyzed thermally by the DSC and had the following properties:

| | |
|---|---|
| 152.4° C. | Tg (glass transition temperature) |
| 199.2° C. | Tc (glass crystallizing peak temperature) |
| 275.8° C. | Tr (glass remelt peak temperature) |

Figure 2:
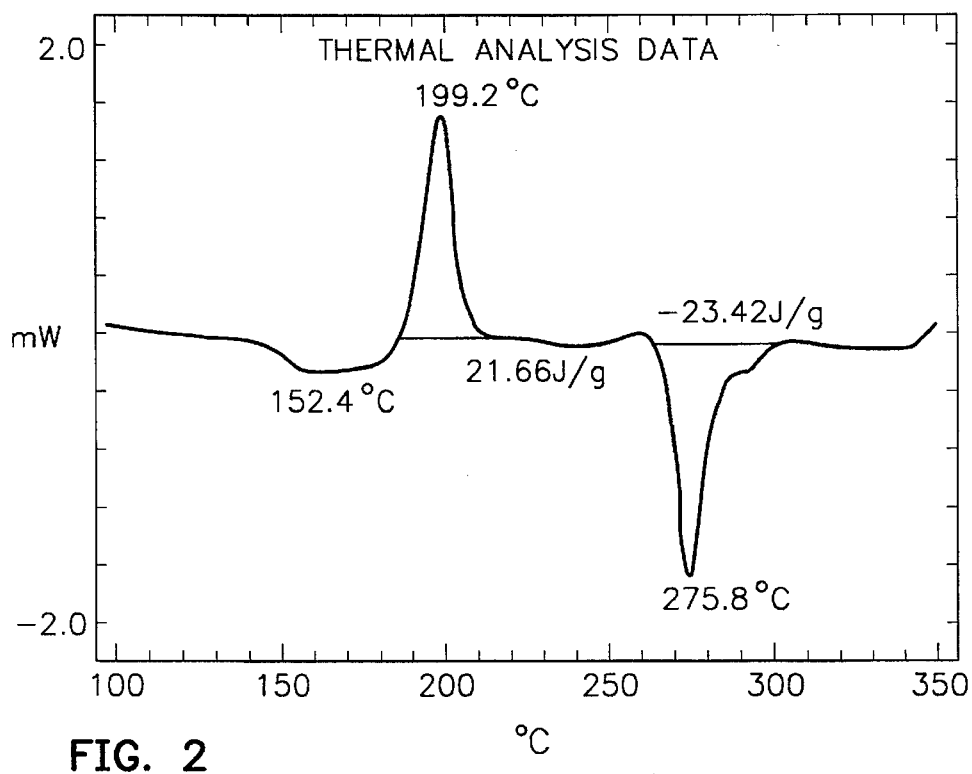
FIG. 2 is a more detailed DSC plot of Curve B in FIG. 1 showing the Tg, Tc & Tr and the associated enthalpy values.

The results for the glass composition M666 are depicted graphically in FIG. 2. These properties are summarized in Table III for most of the melts recorded. The most preferred glass (M666) has only one crystal peak and one low temperature remelt peak, which is ideal as previously discussed.

The oxidation state of the Pb used in the melt formulation was shown to have a significant impact on the properties of the glasses of the present invention as shown by M734, M735, and M736 of Table III. The Pb cation ratio was kept constant which explains the slight difference in the weight percentages of $PbO_2$, PbO, and $Pb_3O_4$. In M735, which utilizes PbO, (the preferred ingredient in the Friesen '071 patent), there are 2 crystal peaks and 2 higher temperature remelts. M736 utilizing $Pb_3O_4$, on the other hand, behaved similar to M734 utilizing $PbO_2$, yielding a single lower temperature remelt, the preferred result.

Unlike the Ag/glass described in U.S. Pat. No. 4,933,030, the Ag/glass described herein can utilize the following types of solvents alone: aromatics, aliphatics, alcohols, esters, ethers, and ketones, or a combination of the following solvents: aromatics, aliphatics, alcohols, esters, ethers, glycols and ketones. The particular solvent or blend and ratio thereof selected depends upon the desired functional properties of millability, dispensing, voiding, odor, evaporation, temperature, viscosity, stability and solvent bleeding. Basically, the preferred solvents are those of low hydrogen bonding (polarity) that give the best overall results in voiding and adhesion. It is desirable to keep the fraction of polar solvents down to a level to prevent voiding yet still impart some of the desirable features of the polar solvents such as millability, minimum solvent bleed and good dispensing rheology.

It has been found that certain of the preferred solvents can be utilized without the necessity of any resin to be present. For example, a solvent blend containing dimethyl heptanol and alpha terpineol alcohols in a 1:1 ratio was found to be a particularly preferred resin-free solvent blend. For the examples of Ag/glass paste that are described below, this blend of alcohol solvents was used.

A particular advantage of a blend of two or more solvents is the broader temperature range of the solvent evolution during processing. Using one solvent usually results in a high weight loss over a relatively short temperature range. With such a weight loss, solvent evolution can occur too rapidly, potentially resulting in voiding or poor adhesion in the Ag/glass matrix beneath the die being attached. Using a solvent blend distributes the weight loss over a wider temperature range, assuming the blended solvents differ in the temperatures at which evolution occurs. It has also been found to be advantageous in some situations to use a small amount of a wetting agent along with the solvent in the paste to promote wetting and stability. A particularly preferred wetting agent has been found to be RE610 produced by GAF Chemicals of Wayne, N.J., in an amount of about 0.01% by weight of the final Ag/glass paste.

In one preferred embodiment, chabazite is added at 0.5% weight or less of the final material and preferably about 0.2%. Chabazite is known as hydrated calcium aluminum silicate, having the formula $Ca_2[(AlO_2)_4 (SiO_2)_8] \cdot 13H_2O$. Chabazite, a zeolite mineral, functions as a molecular sieve that absorbs moisture. The naturally-occurring sodium and potassium have been substantially removed from the chabazite for use within the paste. Use of chabazite is particularly advantageous because it allows the Ag/glass material to getter moisture with minimal amounts of ionic contamination in the paste. Because upper limits on moisture (5000 ppm in a sealed cavity) and ionic level (<25 ppm Na+) are well within passing with the final formulation, this additive has unique properties for use independent of the Ag/glass paste described herein. Therefore, this additive is not limited to use with the Ag/glass paste described herein, but is applicable to any die attach material being used in a hermetically sealed cavity requiring low moisture and low ionics.

Although a preferred Ag flake composition was used in the preferred embodiment, it is recognized that many other forms of silver, other metals, oxides, etc. can be used as powders, flakes, or mixtures of powders and flakes. The paste, for example, could include conductive metallic particles such as Au, Al, Cu, Ni, Pd, Zn, Sn and Pt. A wide range of silver mixes (i.e., a wide range of different surface areas and tap densities) will provide acceptable adhesion for many applications of the Ag/glass paste described herein. Experiments have been performed to optimize the silver mix to provide optimum adhesion, and the presently preferred composition has the following characteristics:

| Flake # | % Flake in Paste/wt | Surface Area Range $m^2$/g | Tap Density Range g/cc |
|---|---|---|---|
| 1 | 8.9 | 1.5–8 | 2.5–7 |
| 2 | 12.7 | .3–1.5 | 3–7 |
| 3 | 27.0 | .05–1 | 4–7.5 |
| 4 | 34.7 | .1–1 | 3.5–7 |

In one implementation, the Ag and glass powder samples were each thoroughly blended with the preferred alcohol solvent mix at a 91:9 ratio and then dispersed into a homogeneous creamy paste by passing them through a 3 roll mill. A range of Ag to glass (solids) ratios from 8:1 to more than 35:1 were produced.

Figure 4:
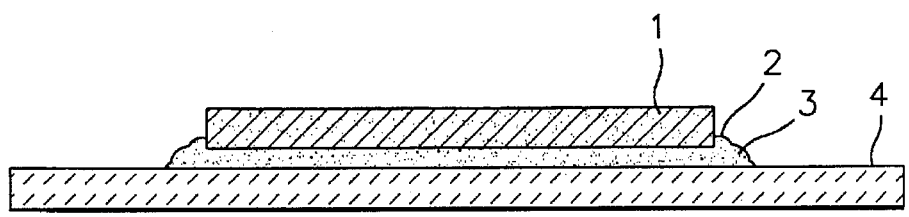
FIG. 4 is a side sectional view of a preferred environment of use of the present invention.

The resulting Ag/glass paste samples were then used to attach silicon die to bare and/or Au metallized ceramic. This was accomplished by depositing a controlled volume of paste (the volume determined by the size of the die) with a positive displacement syringe. The die was placed on top of the deposited Ag/glass dot and pushed down uniformly to produce a fillet around the edge of the die as depicted in FIG. 4.

The assembly was then placed in a furnace and fired, typically at a peak temperature of 350° C. for ten minutes.

Because of the organic system used, no predrying step is required. During the heat up, the glass crystallizes and the organics are driven off before the remelt temperature of 275° C. The glass wets the interface at about 290°–300° C. and continues to wet as the Ag/glass structure sinters tighter pushing more glass to the interfaces. During the cool down of the assembly, the glass recrystallizes again around 200° C. or slightly higher. It is this recrystallization that, it is believed, is responsible for the high initial adhesion and high retained adhesions after thermal cycling. Table 4 shows the results of these tests:

TABLE 4

Adhesion to Bare/Au Metallized Substrate, % Glass Impact

| Material Lot # | 02245A | 02245A | E826 | E827 | E828 | E828 |
|---|---|---|---|---|---|---|
| Wt % Glass | 13.3 | 13.3 | 12 | 10 | 8 | 8 |
| Metal/Glass Ratio | 6.5:1 | 6.5:1 | 7.3:1 | 9:1 | 11.5:1 | 11.5:1 |
| Substrate Type | Au | Bare | Au | Au | Au | Bare |
| Avg. Adhesion (lbs) | 212+ | 228+ | 217+ | 221+ | 206+ | 228+ |
| Adhesion Range | 183–228+ | 228+ | 197–227+ | 213–227+ | 135–228+ | 227–229+ |
| Material Lot # | E835 | E835 | E836 | E836 | E840 | E839 |
| Wt % Glass | 6.5 | 6.5 | 5 | 5 | 4 | 3 |
| Metal/Glass Ratio | 14.4:1 | 14.4:1 | 19:1 | 19:1 | 24:1 | 32.3:1 |
| Substrate Type | Au | Bare | Au | Bare | Bare | Bare |
| Avg. Adhesion | 168 | 227+ | 109 | 229+ | 228+ | 172+ |
| Adhesion Range | 14–185 | 227–228+ | 49–154 | 228–231+ | 227–228+ | 62–227+ |

Figure 5:
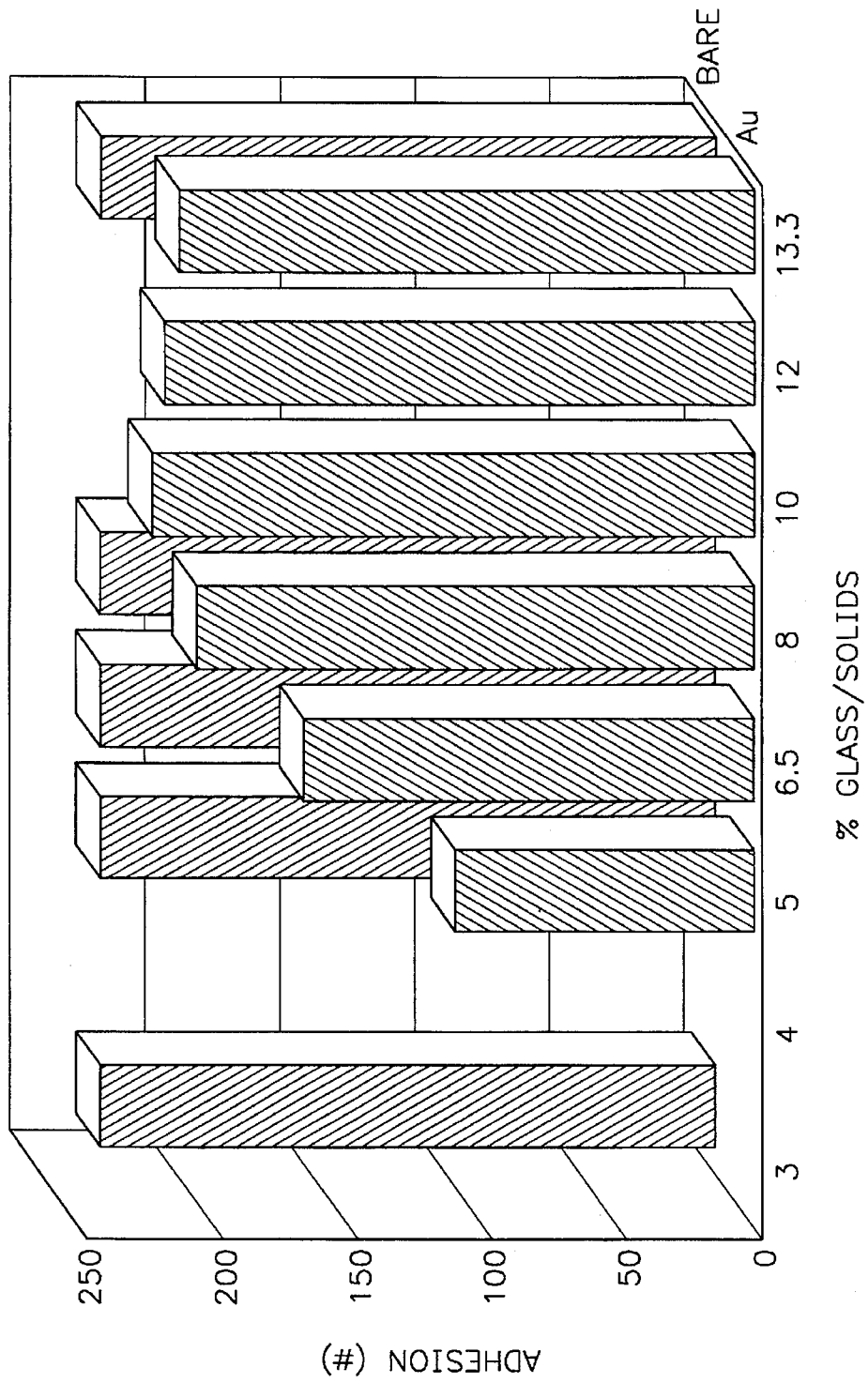
FIG. 5 is a bar graph of the adhesion observed when the ratios of metal/glass are varied, using a bare substrate or a metallized substrate.

Other information relating to the results in Table 4 follows:

Die: 0.460" bare silicon
Substrate: Sumitomo Au and bare Ceramic
Fired Bondlines: 3–5 mils.
Diemat Tester: Sebastian III Stud Puller The data shows that this Ag/glass can be used at glass levels lower than 13.3% (6.5:1 metal/glass). In order to have consistent adhesion to both Au and bare ceramic, the highest metal/glass ratio feasible is a 92:8 ratio (i.e., 11.5:1). On Au-metallized ceramic, the material begins to lose adhesion at a metal/glass ratio of 11.5:1 (8%) while on bare ceramic adhesion is still very good as low as 24:1 and even 32:1. Therefore, for bare ceramic uses, higher metal/glass ratios can be used than for metallized ceramics. FIG. 5 is a bar graph that plots the results shown in Table 4 and shows this result.

As the glass levels decreases, the failure mode on Au-metallized substrates moves from M to MC (failure within the material but very close to the ceramic interface). At a ratio of 19:1 the failure is essentially at the ceramic even though there is still some adhesion.

Radius of curvature (ROC) data on 14.4:1 vs. 11.5:1 vs. the standard 6:5:1 showed favorable results. Both low glass levels were higher in ROC (4.25 m and 3.8 m compared to 3.35 m) than the control and are generally indicative of low-stress bondlines.

Additionally, it is preferred that the Ag/glass paste have as low a solvent content as possible. Solvent contents as low as 9% by weight have produced good results, and it is believed that solvent contents as low as 8% will also produce acceptable results. Generally, solvent contents of about 8% to about 15% should provide acceptable results.

Another low glass material, labeled "RW152" having a 11.5:1 metal/glass ratio has been tested for moisture, thermal conductivity, and Young's modulus (flexure). The following RGA data in Table 5 confirms that reducing the percentage of glass doesn't impact moisture gettering ability of the material.

TABLE 5

RGA Mositure Results

| Material | RW152 | QMI3555 | Blanks | QMI2569FM |
|---|---|---|---|---|
| Lot # | 05225A | 05235A | — | 04105A |
| Descr | Low Glass | Standard | 22 Ld SBraze | Control |
| Ave CO2 (ppm) | 25333 | 15900 | 850 | 18100 |
| Range CO2 (%) | 17.5–34.9 | 15.0–16.7 | 0.6–1.1 | 1.81 |

TABLE 5-continued

RGA Mositure Results

| | | | | |
|---|---|---|---|---|
| Ave H20 (ppm) | 1700 | 1000 | 4000 | 200 |
| Range H20 ppm | 1500–2000 | 800–1200 | 3100–4900 | 200 |
| Ave H2 (ppm) | <105 | 174 | 2403 | 509 |
| Ave HC (ppm) | <119 | 145 | <2340 | 140 |
| Notes | 3 Parts | 3 Parts | 2 Parts | 2 Parts |

Results of testing show a 38.9% increase in thermal conductivity comparing the standard 3555 (6.5:1) to the new RW152 that has a 11.5:1 metal to glass ratio (8%) material. Based on the 3555's thermal conductivity of 90.63 this translates to a much improved 112 W/mk.

Based on the formula for flexure modulus, a representative number can be found. A bar of cross-section dimensions 0.2" (Height)×0.35" (Width) was measured for deflection from a force placed in the center of the bar between two fixed points 1.9" (Length) apart.

Modulus=(Force×(Length$^3$)/(4×Deflection×(Height)$^3$× Width)

TABLE 6

Modulus Measurements

| Material | # Readings | Modulus (Psi) | Range (MPsi) | Hardness Shore D |
|---|---|---|---|---|
| QMI3555 | 7 | 1,400,000 | 1.23–1.78 | 75 |
| RW152 | 8 | 1,220,000 | 1.10–1.38 | 75 |

The following table 7 shows the adhesion resulting from tests with a large die (0.700").

TABLE 7

Large Die Adhesion
Processed with Slower Ramp Rate (<15° C./min all the way to 300° C.)

| Date | 6/28 | 6/28 | 6/28 | 6/28 |
|---|---|---|---|---|
| Mat'l | QMI3555 | RW152 | QMI3555 | RW152 |
| Lot # | 04065A | 05225A | 04065A | 05225A |
| Descr | 13% Std | 8% (QMI) | 13% Std | 8% (QMI) |
| Sub | Au | Au | Bare | Bare |
| Profile | 325C/10' | 325C/10' | 325C/10' | 325C/10' |
| Adh (#) | 1037 | 756 | 1060 | 881 |
| SD | 225 | 26 | 204 | 76 |
| Range | 1010–1072 | 512–802 | 983–1127 | 619–1069 |
| F Mode | M, MC, MSI | MCI, MC, MS | M, MSI | MCI, MSI |
| Notes | 2 Si Fails | 1 Si (NOt Inc) | OK | OK |

The following table 8 shows the result of temperature cycling tests:

TABLE 8

Temperature Cycling

| Material | RW152 | QMI3555 | RW152 | QMI3555 |
|---|---|---|---|---|
| Lot # | 05225A | 05235A | 05225A | 05235A |
| OBO | 318C | 318C | 350C | 350C |
| Seal | Solder | Solder | Solder | Solder |
| Die/Sub | 0.600"/Bare | 0.600"/Bare | 0.600"/Au | 0.600"/Au |
| Initial Adh # | 420 | 728 | 646 | 670 |
| SD/FM | 282/MS, MSI | 50/M | 105/M | 46/M |
| Range | 51–675 | 653–782 | 505–778 | 609–730 |
| 147 T/C # | 736 (4 Pts) | 722 | 663 | 679 |
| SD/FM | 59/MS | 21/M | 70/M | 58/M, MS |
| Range | 496–784 | 568–809 | 516–702 | 630–688 |
| 1000 T/C # | 652 | 662 | 724 | 579 |
| SD/FM | 150/MS | 58/M | 59/M | 138/Si |
| Range | 396–786 | 600–733 | 614–782 | 342–683 |

Tables 6–8 illustrate that the higher silver/glass ratio used in the RW152 has good, if not better die-stress characteristics than the low Ag/glass ratio material. Modulus, large die adhesion and temperature cycling are all tests where failures or variant data can be indicative of high die stress. In each case, the low metal/glass material, RW152, compared favorably.

FIG. 4 is a side view of a typical integrated circuit silicon chip 1 mounted on a ceramic substrate 4, the package being bonded together by a die-attach crystallizing glass 2 having Ag particles 3 dispersed therein. It will be understood by the skilled artisan that FIG. 4 is schematic only. In actual practice and in the preferred embodiments, the silver powder, being in relatively large amounts volume wise, fuses during the heating process and rarely remains as discrete particles as shown, thus rendering the ultimate bond structure opaque. The purpose of the schematic in FIG. 4 is to illustrate within the bounds of simple draftsmanship that the bond structure achieved is a solid structure of fused silver particles having between their interstices (i.e. substantially filling the interstices) a partially crystalline glassy adhesive structure of the glass composition of the present invention, essentially free of resin and organic solvent, and having a low moisture content.

PRECRYSTALLIZATION

Figure 3:
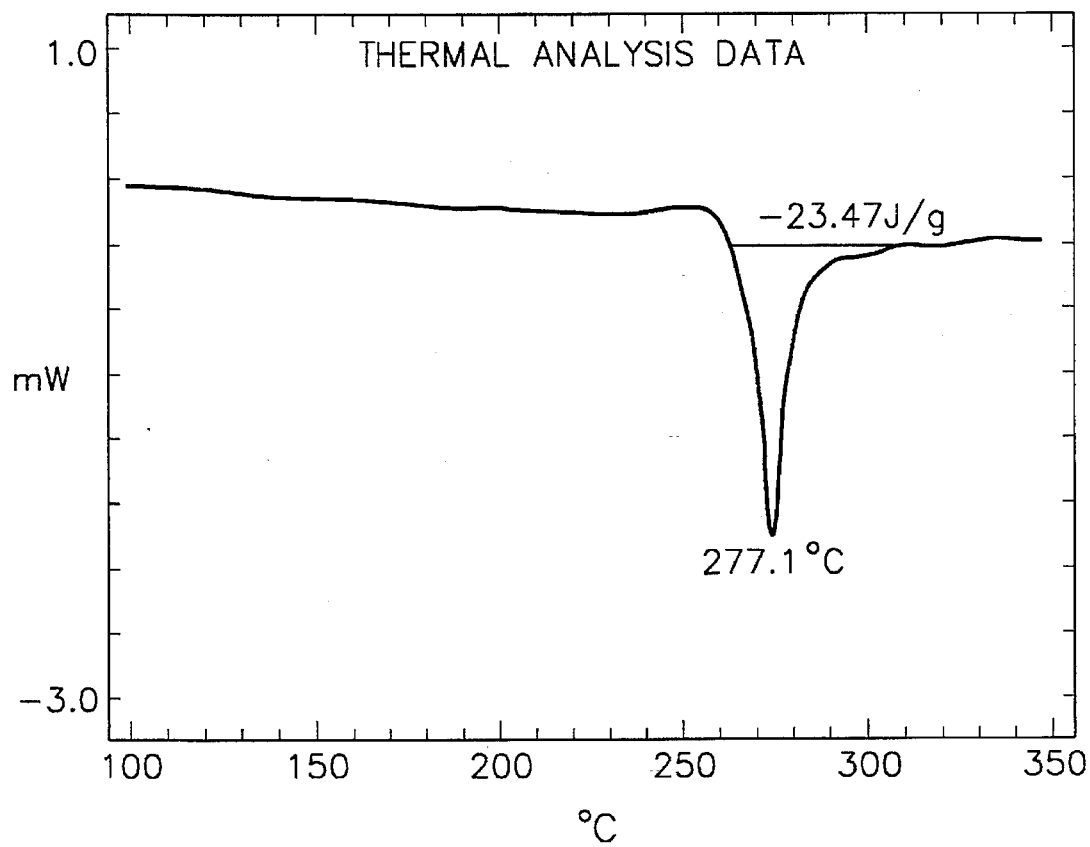
FIG. 3 is a DSC plot of a precrystallized glass of FIG. 2.

In processing large-area die, it was noted that if the glass was precrystallized before incorporating it into an Ag/glass paste, a wider process window was achieved. The precrystallizing was accomplished by baking the glass powder at a temperature of 185 to 250° C. for ⅓ to 1 hour. After cooling, a sample was run in the DSC and the results are shown in FIG. 3. Note that there is no Tg reaction since this only occurs in a vitreous glass. Nor is there a crystallization peak (Tc) since the powder has already been crystallized by the baking cycle. The only activity is a single remelt at the normal 275° C., where the glass changes abruptly from a high viscosity of a solid to a low viscosity glass that wets the ceramic and semi-conductor die at low temperatures.

Some very significant advantages were noted in the processing of large area die by using the precrystallized glass powder, such as better wetting and high adhesion, as shown below:

| LOT # | DESCRIPTION | DIE SIZE | ADH % A (1) |
|---|---|---|---|
| B499 | Standard Glass-FIG. 2 | 2 cm | 115# 57A |
| B500 | Prexstal Glass-FIG. 3 | 2 cm | 227# 100A |

(1) % A denotes the percent of the desirable failure mode occurring within the Ag/glass matrix (cohesive) as opposed to that occurring at the interface (adhesive).

The improved results when using the precrystallized glass is thought to be due to the glass powder outgassing during the precrystallizing bake caused by the crystallization itself. The rearrangement of the amorphous glass during crystallization apparently pushes out substantially all absorbed gas in the structure and results in a denser glass of tightly packed crystals. This was evident by the smaller volume occupied by a pre-crystallized glass powder when compared to a vitreous (not precrystallized) of the same weight. Eliminating the Tg may also allow more time to drive off organics without entrapment during the processing.

Much of the prior art in low temperature glasses teaches ways to keep the glass from devitrifying because of the instability of the glass, i.e., the uncontrolled crystallinity. The glasses described herein, however, are capable of having an inherent amount of crystallization which is controlled by the specific composition, the melting process, and the application process of the Ag/glass. The resultant glass/ceramic formed in the final assembly results in properties far exceeding other low temperature glasses as well as many high temperature glasses.

Another significant advantage the Ag/glass paste described herein has over the Ag/glass paste described in U.S. Pat. No. 4,933,030 is the higher temperature processing capabilities. The vitreous nature of the glass of U.S. Pat. No. 4,933,030 prevents processing above about 400° C. without a significant decrease in adhesion. The M666 glass however, because of its partially crystallized nature, can be fired at 450° C. with excellent adhesions as shown in the following data (which is shown in Table 5 of the parent application Ser. No. 08/265,919).

| Firing Temperature | Adhesion (.400" × .400" Die) |
|---|---|
| 300° C. | 220 lbs. |
| 350° C. | 198 lbs. |
| 450° C. | 220 lbs. |

This wide range of firing temperature allows applications in which the die-attach is done at low temperatures, e.g. 350° C., and subsequently sealed (glass) at high temperatures, e.g. 450° C.

SEALING GLASS

Because the unique glass of the present invention has no water soluble components, the chemical durability is excellent, as was determined by the insignificant weight loss of the glass when heated in $H_2O$. This chemical durability, along with the low temperature properties of the glass, makes this glass an ideal candidate for hermetically sealing ceramic packages at lower temperatures.

To evaluate the feasibility of achieving adequate bonding of two ceramic surfaces using the present invention, the freely divided particles of M666 (as previously described in detail) were made into a paste consisting of:

80% M666 glass particles

20% 686 solvent

This paste was thoroughly mixed and doctor bladed to a ceramic surface of a 92% black $Al_2O_2$ body (commonly used in ceramic packaging) and subsequently heated to 350° C. for 10 minutes and cooled down. Inspection revealed a homogeneous crystallized glass with good adhesion to the ceramic. However, the cross section revealed a porous structure filled with many small bubbles. These bubbles could essentially be eliminated by precrystallizing the glass powder before the sealing process. This was accomplished in the same manner as was done with the Ag/glass, namely baking the glass powder at a temperature of 185°–250° C. for ⅓ to 1 hour, which crystallizes the glass as illustrated graphically in FIG. 3.

When put in a paste with the Exxon aliphatic 686 solvent, doctor bladed on a ceramic surface, heated to 350° C. for 10 minutes, cooled to room temperature and inspected, the porosity disappeared and a smooth glaze was evident. This unexpected result is thought to be due to the glass powder outgassing during the precrystallizing bake, as explained earlier, as well as allowing organics to escape before entrapment.

It is well known in the art that thermal expansion modifiers can be used as fillers with the glass powder to more closely match the expansion of the adjoining ceramic body, creating a more thermal shock resistant structure. The following expansion modifiers of low expansions were admixed at various amounts with the pre-crystallized glass power of M666 and the 686 solvent -$Nb_2O_5$, $Ta_2O_3$, $V_2O_5$, $PbTiO_3$, $ZrW_2O_5$, $SiO_2$, $TiO_2$, and $Y_2O_3$, doctor bladed on ceramic, heated to 350° C. for 10 minutes, allowed to lower to room temperature, and inspected.

Other expansion modifiers such as beta-eucriptite ($LiAlSiO_3$), amorphous silica, and various other phosphates, vanadates, arsenates, antimonates, mobates, and tantalates have been shown to improve their thermal shock resistance of sealed ceramic or metal/ceramic substrates, and are considered part of the present invention when used with the glass, either as a die attach paste or when sealing a variety of different ceramic or glass ceramic bodies.

THERMALLY CONDUCTIVE GLASS

Another potential application of the new glass is for an electrically insulating, high thermally dissipating adhesive for various discrete electronic components. A most common application would be for attaching semiconductor devices that need to be electrically insulated from the substrate yet provide good thermal dissipation through the adhesive. The common Ag/glass adhesive paste has both excellent electrical and thermal dissipation and hence is not applicable.

To assess the utility of the glasses of the present invention, the M355 glass powder was loaded with powders of the synthetic diamond powder, AlN, $Cu_2O$, Ni, Al, $Al_2O_3$, $BeO_2$, and BN all with excellent thermal conductivity. The most promising combination was with synthetic diamond powder from Engis Corporation. Diamond powders of different size and mounts were admixed with the M355 powder and terpineol to make a paste. This was applied to a ceramic and a silicon die placed on top. The assembly was fired, similar to an Ag/glass paste, to 350° C. for 10 minutes and allowed to cook Diamond powder of a size of 15 to 36 microns loaded at 40% of the glass powder, was found to give superior adhesion along with excellent thermal conductivity. Other high thermally conductive ceramic or metal powders could be used for this application and are considered part of the invention.

It is apparent that many minor modifications and variations of the present invention are obvious to those skilled in the art of glass making, Ag/glass paste making, sealing glasses, semiconductor packaging, and related arts. For example, any precursors of the oxides, such as carbonates, nitrates, sulphates, etc., can be used in place of the oxides, since they break down to the oxides during the melting process. Such modifications, additions, or improvements are thus considered a part of the present invention, the scope of which is determined by the following claims:

What is claimed is:

1. An essentially resin free paste consisting essentially of by weight:

from about 60% to about 90% of conductive metallic particles selected from the group consisting of Ag, Au, Al, Cu, Ni, Pd, Zn, Sn and Pt;

from about 2% to about 24% of a glass composition which consists essentially of, by weight on an oxide basis about 40–65% $Ag_2O$ about 15–35% $V_2O_5$ about 0–20% $TeO_2$ and about 0–30% of at least one of a group consisting of $PbO_2$ and $Pb_3O_4$, wherein said conductive metallic particles and said glass composition have a ratio by weight of no more than about 32:1;

about 8–15% of an organic solvent; and a resin percentage of less than 0.1% of said paste.

2. A paste according to claim 1 wherein said ratio of conductive particles to glass composition has a ratio between about 8:1 and about 24:1.

3. A paste according to claim 1, wherein said conductive metallic particles consist essentially of silver flake.

4. A paste according to claim 1, wherein said organic solvent includes at least one solvent selected from the group consisting of aromatics, aliphatics, alcohols, esters, ethers, glycols and ketones.

5. A paste according to claim 1, wherein said organic solvent is a blend of alcohols.

6. A paste according to claim 1, wherein said paste consists essentially of by weight:

about 84% of silver flake about 7% of said glass composition and about 9% of said solvent.

7. A paste according to claim 1, wherein said glass composition consists essentially of by weight on an oxide basis:

about 40–50% $Ag_2O$ about 15–25% $V_2O_5$ about 5–20% $TeO_2$ and about 5–25% of at least one of a group consisting of $PbO_2$ and $Pb_3O_4$.

8. A paste according to claim 1, wherein said glass composition consists essentially of by weight on an oxide basis:

about 47% $Ag_2O$ about 22% $V_2O_5$ about 9% $TeO_2$ and about 22% $PbO_2$.

9. A paste according to claim 1, wherein said paste further includes chabazite in a percentage by weight of less than 0.5%.

10. A paste according to claim 9, wherein said paste further includes chabazite in a percentage of approximately 0.2% by weight.

11. An essentially resin free paste consisting essentially of by weight: from about 60% to about 90% of conductive metallic particles selected from the group consisting of Ag, Au, Al, Cu, Ni, Pd, Zn, Sn and Pt;

from about 2% to about 24% of a glass composition comprising, by weight on an oxide basis;

about 40–65% $Ag_2O$ about 15–35% $V_2O_5$ about 5–20% $TeO_2$ and about 0–30% of at least one of a group consisting of $PbO_2$ and $Pb_3O_4$ wherein said conductive metallic particles and said glass composition have a ratio by weight between about 8:1 and about 24:1;

about 8–15% of an organic solvent; and a resin percentage of less than 0.1% of said paste.

12. A paste according to claim 11, wherein said conductive metallic particles consist essentially of silver flake.

13. A paste according to claim 11, wherein said organic solvent is a blend of alcohols.

14. A paste according to claim 11, wherein said organic solvent contains at least one solvent selected from the group consisting of aromatics, aliphatics, alcohols, esters, ethers, glycols and ketones.

15. A paste according to claim 11, wherein said paste consists essentially of by weight:

about 84% of silver flake about 7% of said glass composition and about 9% of said solvent.

16. A paste according to claim 11, wherein said glass composition comprises by weight on an oxide basis:

about 64% $Ag_2O$ about 22% $V_2O_5$ about 14% $TeO_2$.

17. A paste according to claim 11, wherein said paste further includes chabazite in a percentage by weight of less than 0.5%.

18. A paste according to claim 17, wherein said paste further includes chabazite in a percentage of approximately 0.2% by weight.

* * * * *